Figure 1:
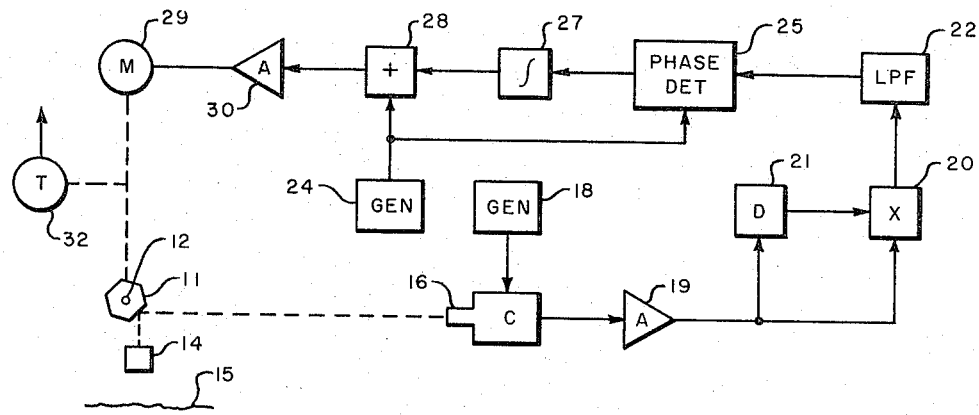

March 14, 1967 G. STAVIS 3,308,710
GROUND VELOCITY INDICATOR FOR VEHICLES
UTILIZING TWO SCANNING RATES
Filed June 14, 1963 2 Sheets-Sheet 1

INVENTOR.
GUS STAVIS
BY H. S. Mackey
ATTORNEY.

INVENTOR.
GUS STAVIS

United States Patent Office 3,308,710
Patented Mar. 14, 1967

3,308,710
GROUND VELOCITY INDICATOR FOR VEHICLES UTILIZING TWO SCANNING RATES
Gus Stavis, Briarcliff Manor, N.Y., assignor to General Precision, Inc., a corporation of Delaware
Filed June 14, 1963, Ser. No. 288,022
5 Claims. (Cl. 88—1)

This invention relates to velocity sensors and more particularly to velocity sensors suitable for use in vehicles travelling in close proximity to the ground or other surfaces. In addition the invention relates to vehicle mounted velocity sensors which respond to relative motion between the vehicles and the ground or other supporting surfaces by the use of an optical device which requires no mechanical connection to the ground and is therefore particularly suited for use in air supported or hover vehicles which must be maintained out of physical contact with the ground or other surface.

While the invention is particularly suited for use in hover vehicles which are subject to drift, it is also extremely useful in conventional wheeled or track vehicles which are not ordinarily subject to drift since it is capable of supplying accurate velocity and direction information which make possible accurate dead reckoning navigation of vehicles employing the invention.

Conventional wheeled and track vehicles such as tanks and exploration vehicles currently employ dead reckoning navigation devices. These generally include a pair of tachometers driven by wheels or tracks located on opposite sides of the vehicle, a heading reference, and a dead reckoning navigational computer for continuously supplying the coordinate location of the vehicle from the tachometer and heading inputs.

These devices are, however, limited in accuracy under certain operating conditions. If the vehicles are operating on sand, loose soil, or ice, the slippage between the supporting surface and the wheels or tracks which drive the tachometers may introduce enough error to render the coordinate location, as determined by the computer from the inputs thereto, unsuitable for certain uses.

One object of this invention is to provide an accurate and reliable velocity sensor, for use in vehicles travelling in close proximity to a surface, which is not affected by the condition of the surface over which the vehicle is passing.

Another object of the invention is to provide a velocity sensor for hover vehicles which requires no physical contact with the vehicle supporting surface.

Yet another object of the invention is to provide a velocity sensor for use in vehicles for travelling in close proximity to the ground or other surface which provides sufficient information to determine both velocity and drift angle of the vehicle with respect to the surface.

A further object of the invention is to provide a velocity sensor for detecting the relative velocity between two objects, said sensor mounted on one object and requiring no physical contact with the other object.

The invention contemplates a velocity sensor for use in vehicles travelling in close proximity to a surface comprising a pair of identical optical sensors located on opposite sides of the longitudinal axis of the vehicle. Each of the sensors includes a movable means for viewing a small area of the surface for a limited time, means for successively scanning a narrow portion of the area having a component in the direction of travel and for generating an electric signal corresponding to the physical characteristics of the scanned portion. A phase measuring means responsive to the generated signals supplies an error signal corresponding to the phase displacement of successive scans occurring during the limited time period. This signal is applied to motive means which alters the velocity of the viewing means in a direction which causes the error signal to go to zero. A navigational computer of conventional design provides velocity and direction information relative to the vehicle from the velocity of the motive means of the two sensors.

The foregoing and other objects and advantages of the invention will become more apparent from a consideration of the specification and drawing wherein several embodiments of the invention are described and shown in detail for illustration purposes only.

Figure 2:
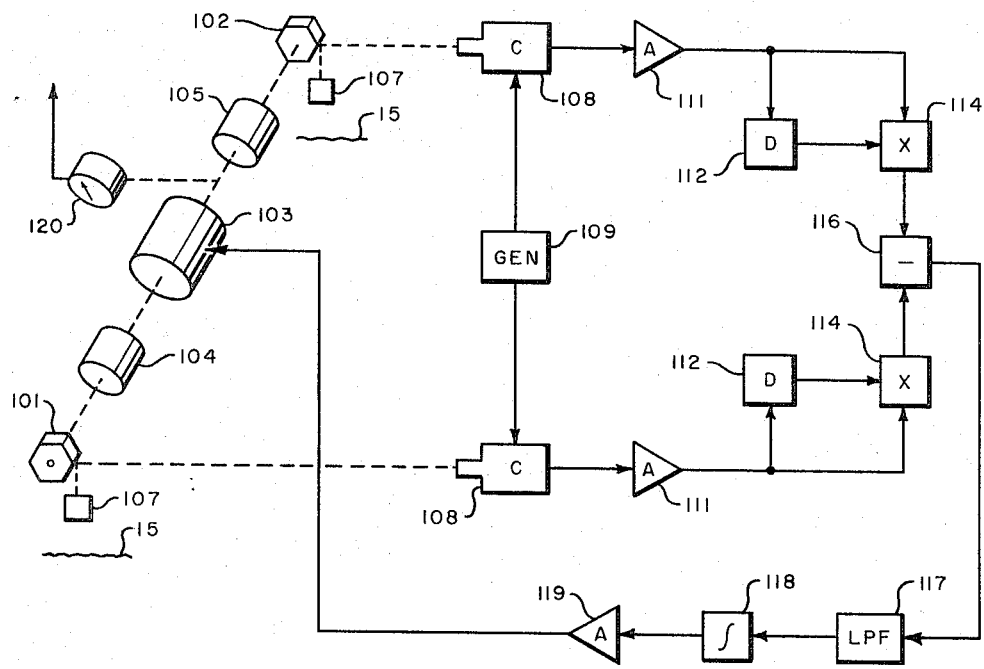
Figure 3:
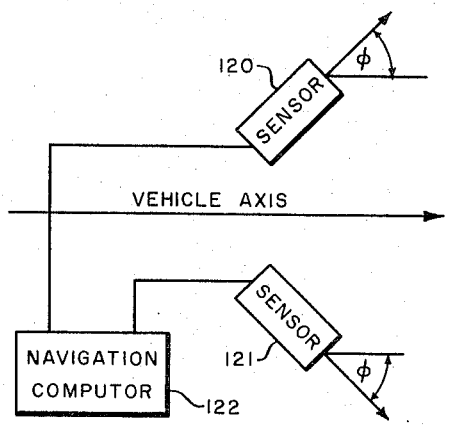
Figure 4:
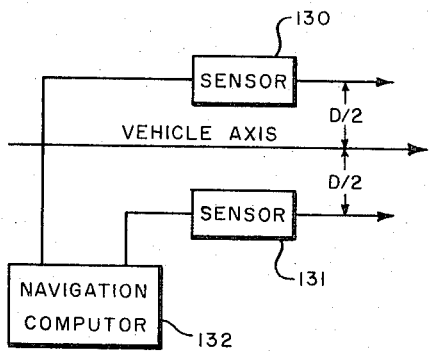
Figure 5:
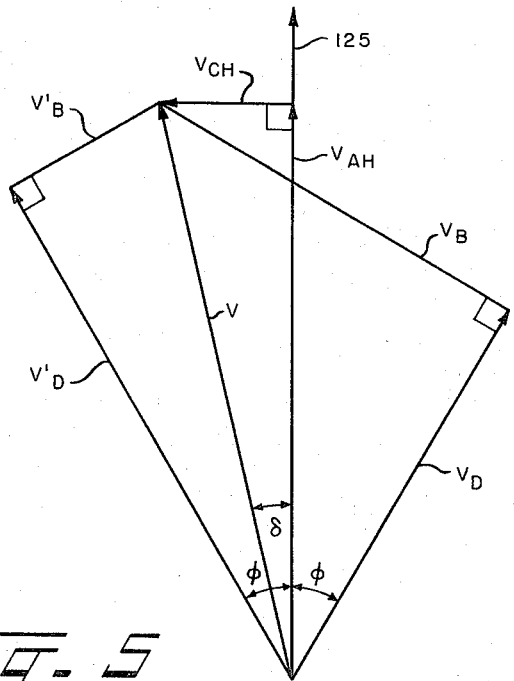

In the drawings:
FIGURE 1 is a schematic diagram of a single element velocity sensor constructed in accordance with the invention;
FIGURE 2 is a schematic diagram of a dual element velocity sensor constructed in accordance with the invention;
FIGURE 3 is a schematic diagram of a novel navigation system utilizing the novel sensor for use in vehicles subject to drift;
FIGURE 4 is a schematic diagram of a navigation system utilizing the novel sensor for use in vehicles not subject to drift; and
FIGURE 5 is a graph for illustrating the operation of the novel navigation system shown in FIGURE 3.

FIGURE 1 illustrates a single element velocity sensor. This sensor includes a multi-sided mirror 11 mounted for rotation on a shaft 12 fixed to the vehicle to be navigated. A lens system 14 also rigidly attached to the vehicle is located below the mirror 11 and views a small area 15 over which the vehicle is travelling. A television pick-up tube 16 is directed at mirror 11 and views a narrow portion of area 15. A sweep generator 18 provides a vertical sweeping voltage to pick-up tube 16 to periodically scan a narrow portion of the image of area 15 formed on mirror 11. The portion viewed is directed along a component of the vehicle velocity.

The output of pick-up tube 16 is amplified by an amplifier 19 and applied to one input of multiplying circuit 20. In addition the output of amplifier 19 is delayed by a circuit 21 an amount of time equal to the period of generator 18, thus successive scans are multiplied in circuit 20.

Circuit 20 will provide an output having an alternating component, and a direct current component which is related to the instantaneous phase shift between the delayed and undelayed signals from amplifier 19. The multiplier 20 may be any of several different kinds; however, a true multiplier circuit such as the well-known Hall-effect multiplier is preferred.

Although not, in general, of sinusoidal form the delayed and undelayed outputs of amplifier 19 may be considered as being made up of sinusoidal components of the form ($e \cos n\omega t$) and ($e \cos n[\omega t + \alpha]$). These expressions when multiplied may be expressed as $$\frac{e^2}{2}[\cos n(2\omega t + \alpha) + \cos (n\alpha)]$$

If this expression is averaged over a number of cycles, the first term is zero and the second term is a constant having a value determined by $\alpha$. In the above expression $\alpha$ is the phase difference between the two expressions and the second term is a maximum when $\alpha$ is zero. However, a normalizing network may be employed to provide a zero voltage output when $\alpha$ is zero and an increasing voltage, either, negative or positive as $\alpha$ increases. This particular form is desirable since no corrective action is required when the phase shift is zero and the corrective action must increase as the phase shift increases.

A low-pass filter 22 connected to circuit 20 removes the alternating component and passes the unidirectional component which contains the phase shift information from scan to scan of pick-up tube 16.

The output of a square wave generator 24, operating at about 1 c.p.s. and of filter 22 are applied to a phase detector 25 which switches the polarity of the error signal from filter 22 at the frequency of generator 24. This arrangement is necessary since the output of circuit 20 indicates magnitude only and does not normally provide sense information for proper correction of mirror speed. The reasons for employing this arrangement will be set forth in greater detail later.

An integrating circuit 27 is connected to the output of phase detector 25 and integrates the output therefrom. An adding circuit 28 provides an output having a voltage equal to the sum of the instantaneous voltage of generator 24 and integrator 27. This output is applied to a servo motor 29 through a servo amplifier 30.

Motor 29 controls the speed of mirror 11 via shaft 12 and in addition drives a tachometer 32 which provides an electric signal the instantaneous value of which is proportional to the average angular velocity of motor 29 over a finite time period, for example, one or two seconds.

The sensor shown in FIGURE 1 and described above will, if translated over the surface 15 in a straight line, provide at the output of tachometer 32 an electric signal representative of the instantaneous velocity of the sensor with respect to the surface 15. This is accomplished by rotating mirror 11 at an average angular velocity which is a linear function of the translating velocity referred to above.

The actual mirror velocity is modulated at the 1 c.p.s. rate of generator 24 to overcome the lack of error sense in the output of circuit 20. However, the velocity is constant over a number of successive scans of the image formed on the photosensitive surface of pick-up tube 16. If the mirror speed is at the translating speed then the signals generated on successive scans will be in phase and no direct current output will be supplied by circuit 20 and the integrator output will remain unchanged. But when generator 24 switches, the speed of mirror 11 will change; this will, assuming a constant translatory velocity, produce an output from circuit 20 since the phase of the output signals from pick-up tube 16 for successive scans will shift. This output will be applied through integrator 27 to motor 29 to cause a change in the motor speed.

From the above it is obvious that only under the condition when motor and mirror angular speeds are equally spaced above and below the translatory velocity will equilibrium be achieved, since the phase detector will under that condition apply equal and opposite signals to integrator 27, thus maintaining an average motor and mirror angular velocity proportional to the translatory velocity referred to above. If the translatory velocity is not centered between the two mirror velocities a net error signal, over one complete cycle of generator 24 will be applied to motor 29. This signal will be negative or positive depending on the direction of the velocity displacement from the above referred to center position.

It was previously stated that the angular velocity of the mirror ($\omega$) was a linear function of the vehicle velocity $\omega = f(V)$. This is true if the distance between the supporting surface and the mirror is constant. If, however, this is subject to variation, the equation should be in the form $\omega = f(V/H)$ where H is the distance between the mirror and the surface. The sensor shown in FIGURE 1 as well as that of FIGURE 2 will, however, provide a high degree of accuracy when employed on land vehicles of the wheeled or track type as well as on air supported vehicles since small variations in H will not introduce a material error if the looking angle of mirror 11 is made small.

If accuracy considerations make it desirable to eliminate the factor H entirely, then the mirror for looking at the supporting surface can be translated parallel to the supporting surface. This may be accomplished by the use of mirrors mounted for translation on an endless belt. Alternatively the pick-up tube 16 may be mounted on the belt to view the supporting surface directly. If this arrangement is employed the linear velocity of the belt will be a function of the vehicle velocity at zero error condition. Another way of eliminating H as a factor is to employ a square rotary prism in place of mirror 11 since the light rays entering and exiting the prism are at all times parallel, and are also normal to the supporting surface which renders them uneffected by changes in H. With this last arrangement lens 14 must be placed above the prisms to receive the light rays passed therethrough.

FIGURE 2 discloses another way to operate the novel velocity sensor to obtain the correct error sense.

In this embodiment two rotating mirrors 101 and 102 are employed. Mirror 101 is connected to a servo motor 103 by a gear box 104 while mirror 102 is connected to motor 103 by a gear box 105. Gear boxes 104 and 105 are arranged so as to add and subtract from the servo motor speed, respectively. Thus the velocity of mirror 101 is $(\omega + \Delta)$ while that of mirror 102 is $(\omega - \Delta)$, where $\omega$ is the angular velocity of servo motor 103 and $\Delta$ is a velocity increment supplied by gear boxes 104 and 105.

Mirrors 101 and 102 are each a part of one of two identical channels each of which includes a lens system 107 located below the mirror and arranged to focus an image on the mirror of a part of the surface traversed by the vehicle, a television pick-up tube 108 for forming an image on its photosensitive surface. A single oscillator 109 supplies vertical scanning pulses to pick-up tubes 108 each of which scans a narrow porton of the image formed on the mirror it views. In each case the scanning is directed along a component of the vehicle velocity. The images formed on mirrors 101 and 102 may be substantially identical; however, this is not a requirement since the output of each channel is a signal which is an independent measure of vehicle velocity.

Each channel includes an amplifier 111 for amplifying the pick-up tube output, a delay circuit 112 for delaying the output of amplifier 111 by an amount equal to the period of the output of oscillator 109, and a multiplying circuit 114 for multiplying the delayed and undelayed outputs of amplifiers 111. Multiplier circuit 114 may be any of several different kinds; however, a true multiplier circuit such as the well-known Hall-effect multiplier is preferred.

The output of multiplier circuits 114, in addition to alternating components, includes a direct current component which is proportional to the phase shift between the delayed and undelayed output of amplifier 111. Two channels are required since the outputs of multiplier circuits 114 lack sense; that is, each circuit provides the same error signal for positive and negative phase differentials of equal magnitude. Therefore the outputs of multiplier circuits 114 are subtracted in a circuit 116, which may employ no more than a simple resistive network to derive an error signal having a sign which indicates the direction of the error.

At zero servo motor speed error the outputs of the multiplier circuits are equal and the output of circuit 116 is zero direct current volts. At any other motor speed the error signal from one multiplier circuit will increase and the other will decrease depending on the direction of the error. Thus the subtraction will provide a sign as well as a magnitude indicative of the sense and magnitude of the deviation of the velocity of the servo motor 103 from the velocity of the vehicle.

A low-pass filter 117 connected to the subtracting circuit 116 passes the direct current component to an integrator 118 which has its output connected to a servo amplifier 119. The output from amplifier 119 controls the speed of motor 103. A tachometer 120 connected to the output shaft of motor 103 provides an electric signal proportional to velocity since the speed of motor 103 is proportional to the vehicle velocity.

In this embodiment unlike that of FIGURE 1 the mirror speeds at no error condition do not correspond to vehicle velocity. That of mirror 101 is above the vehicle velocity and that of mirror 102 below the vehicle velocity. However, the average speed of the two mirrors is proportional to vehicle velocity and equals the speed of motor 103. Thus, at zero error signal the phase differences in both channels are equal, which condition results in zero error signal applied to integrator 118.

If the vehicle velocity increases, the phase error as measured by the channel including mirror 101 decreases while the phase error of the channel including mirror 102 increases. The difference signal is applied to integrator 118 and then to motor 103 via servo amplifier 119 to increase its speed to correspond with the velocity of the vehicle at which time the error signal goes to zero.

If the vehicle velocity decreases, the phase error as measured by the channel including mirror 101 increases while the phase error of the channel including mirror 102 decreases. In this instance the difference signal has an opposite sign and is applied to integrator 118 and then to motor 103 via servo amplifier 119 to decrease the speed of the motor until its speed corresponds to the vehicle velocity, at which time the error signal goes to zero and the servo motor speed is maintained by integrator 118 and servo amplifier 119 so long as the vehicle velocity does not change.

FIGURE 3 illustrates a novel navigation system particularly suitable for land vehicles subject to drift such as air supported or hover vehicles. Two sensors 120 and 121, such as those disclosed in FIGURES 1 and 2 above, are fixedly mounted on opposite sides of the longitudinal axis of the vehicle at an angle $\phi$. The sensor outputs are applied to a navigation computer 122 which may be of conventional design. No details of the computer are disclosed since it is beyond the scope of this invention and the prior art is replete with computers suitable for computing the necessary navigational information from the information supplied by sensors 120 and 121.

A better understanding of the operation of the navigation circuit disclosed in FIGURE 3 may be had by referring to the vector diagram of FIGURE 5 in which the line 125 represents the vehicle axis. The vector V is the actual velocity vector of the vehicle and is unknown. Vectors $V'_D$ and $V_D$ are components of the vehicle velocity supplied by sensors 120 and 121, respectively. While vectors $V'_D$ and $V_D$ are each the vehicle velocity component at angles $\phi$ on either side of the vehicle axis their vector sum is not equal to the actual vehicle velocity vector V.

Vector V may be resolved into two components $V'_D$ and $V'_B$ of which $V'_D$, as previously stated, is known since its magnitude is the output of sensor 120 and the magnitude of vector $V'_B$ while unknown is not needed to compute the magnitude of vector V or the drift angle $\delta$. In a similar manner vector V may also be resolved into two vectors $V_D$ and $V_B$. Here the vector $V_D$ is known since it equals the output of sensor 121 and as above the vector $V_B$ while unknown is not needed to determine the magnitude of vector V and drift angle $\delta$.

In order to dead-reckon navigate the vehicle, it is necessary to determine the magnitude of velocity vector V and the drift angle $\delta$. It is also possible to navigate by solving for $V_{CH}$ the cross heading velocity, $V_{AH}$ the along heading velocity and $\delta$.

From FIGURE 5 the following equations hold.

(1) $\quad |V_D|=|V|\cos(\delta+\phi)$
(2) $\quad |V'_D|=|V|\cos(\phi-\delta)$ and adding (1) and (2) yields (3) $\quad |V_D|+|V'_D|=|V|[\cos(\phi+\delta)+\cos(\phi-\delta)]$
$\qquad =|V|2\cos\phi\cos\delta$ and subtracting (1) from (2) yields (4) $\quad |V'_D|-|V_D|=|V|[-\cos(\phi+\delta)+\cos(\phi-\delta)]$
$\qquad =|V|2[\sin\phi\sin\delta]$ and dividing (3) by (4) yields (5) $\quad \dfrac{|V_D|+|V'_D|}{|V'_D|-|V_D|}=\tan\phi\tan\delta$ from which $\tan\delta$ and therefore $\delta$ may be computed since $\tan\phi$, $|V_D|$ and $|V'_D|$ are known.

In addition solving for the along heading vector (6) $\quad V_{AH}=|V|\cos\delta$ and substituting from Equation 3 for V (7) $\quad V_{AH}=\dfrac{|V_D|+|V'_D|}{2\cos\phi}$ and solving for the cross heading vector (8) $\quad V_{CH}=|V|\sin\delta$ and substituting from Equation 4 for V (9) $\quad V_{CH}=\dfrac{|V'_D|-|V_D|}{2\sin\phi}$ It is seen from the above that all the quantities for solving for $V_{AH}$ and $V_{CH}$ are known. Also knowing $V_{AH}$ and $V_{CH}$, one may readily solve for V, if needed, since

(10) $\quad V=\sqrt{(V_{AH})^2+(V_{CH})_2}$

FIGURE 4 illustrates a use of the novel sensors in a conventional navigation system suitable for use in land vehicles which are not subject to drift. In this system a pair of sensors 130 and 131 are fixedly mounted on opposite sides of the longitudinal axis of the vehicle and directed parallel thereto. The sensor outputs are applied to a navigational computer 132 which may be of conventional design.

The distance travelled is the average of the readings of the two sensors and may be expressed as follows:

(11) $\quad |V_{(t_1)}|=\left|\dfrac{V_{A(t_1)}+V_{B(t_1)}}{2}\right|$ where $V_{(t_1)}$ is the average magnitude of the velocity of the vehicle at time $t_1$ and $V_A$ and $V_B$ are the actual velocity readings of the sensors 130 and 131 at time $t_1$.

If the vehicle turns at any time the turning angle $\theta$ may be defined as

(12) $\quad \theta=\int(V_A-V_B)dt/D$ where $V_A$ and $V_B$ are the same as above and D is the distance between the sensors. The velocity vector of the vehicle relative to $t=0$ is given by (11) and (12) and may be expressed

(13) $\quad V_{(t_1)}=\left|\dfrac{V_{A(t_1)}+V_{B(t_1)}}{2}\right|\Big/\int_0^{t_1}\dfrac{V_{A(t)}-V_{B(t)}}{D}dt$ All the factors in Equation 13 are known and the vector may be computed so as to permit dead reckoning navigation. Navigational computers suitable for processing the information from the sensors to solve Equation 13 are currently used in land vehicles such as tanks and tracked exploration vehicles. As previously pointed out, the use of the novel sensor in this system results in a tremendous gain in accuracy since it is unaffected by slippage between the driving wheels and the supporting surface such as is common on sand, ice, and loose soil. In this combination the novel sensors replace the conventional tachometer connected directly to the supporting wheels or tracks of the vehicle. A heading reference, not shown, is also necessary in the above combination to provide the initial direction of the vector. This reference may be inserted manually or automatically.

While several embodiments of the invention have been shown and described for illustration purposes, it is to be expressly understood that the invention is not limited thereto. Various changes may also be made in the design and arrangement of the parts without departing from the spirit and scope of the invention as the same will now be understood by those skilled in the art.

What is claimed is:

1. A velocity sensor for use in vehicles travelling in close proximity to a supporting surface comprising, servo means, means driven by said servo means for optically scanning a small area of the supporting surface, producing an optical image of said surface the apparent motion of said optical image being a function of the velocity at which said means is driven and the velocity of said vehicle, electronic means for converting said optical image into a series of successive electric wave trains, means responsive to successive electric wave trains for producing an error signal corresponding to the relative phase displacement of successive electric wave trains, bistable means for alternately providing positive and negative voltages, means for controlling the velocity of said servo means responsive to said error signal and the output of said bistable means whereby the rate of optical scan is alternately equally above and below said vehicle velocity, and speed indicator means operated by said servo means.

2. A velocity sensor as set forth in claim 1 in which, said bistable means comprises a square wave generator providing a symmetrical square wave, and said means for controlling said servo means includes, a phase detector responsive to the error signal and said symmetrical square wave for switching the polarity of the error voltage as a function of said square wave, a summing network for adding the error signal derived from said phase detector to the output of said bistable means, and means applying the output of the summing network to said servo means.

3. A velocity sensor as set forth in claim 2 in which, the means for optically scanning the small area of said supporting surface includes a rotatable mirror having a plurality of flat reflective surfaces arranged on its periphery so that for a limited period of time the optical image produced thereby is unchanged in apparent position if the rotational speed of the member corresponds to the velocity of the vehicle.

4. A velocity sensor as set forth in claim 3 in which, the electronic means for converting said optical image into successive electric wave trains includes, a television pick-up tube directed toward the rotary member for forming the optical image produced thereby on the photosensitive surface of the pick-up tube, and a sweep generator for causing the electron beam to scan a single line on the photosensitive surface.

5. A velocity sensor for use in vehicles travelling in close proximity to a supporting surface comprising, servo means, first and second means driven by said servo means for optically scanning spaced small areas of the supporting surface, each of said first and second means producing an optical image of the respective area scanned each apparent image being a function of the velocity at which a respective one of said means is driven and the velocity of said vehicle, said first means being driven by said servo means at a velocity above a selected synchronous speed and said second means being driven by said servo means at a velocity below said selected synchronous speed, first electronic means for converting the optical image produced by said first means into a first series of electric wave trains, second electronic means for converting the optical image produced by said second means into a second series of electric wave trains, a first error signal generator responsive to said first series of electric wave trains for producing a first error signal corresponding to the relative phase displacement of successive wave trains of said first series, a second error signal generator responsive to said second series of electric wave trains for producing a second error signal corresponding to the relative phase displacement of successive wave trains of said second series, subtractive means having said first and second error signals impressed thereon and producing a difference error signal therefrom, means for applying said difference error signal to said servo means, and speed indicator means operated by said servo means.

References Cited by the Examiner

UNITED STATES PATENTS

| | | | |
|---|---|---|---|
| 1,299,058 | 4/1919 | Sundt | 33—46.5 |
| 2,772,479 | 12/1956 | Doyle | 88—1 |
| 3,006,235 | 10/1961 | Brandon | 88—1 |
| 3,059,521 | 10/1962 | Clemens et al. | 88—1 |

JEWELL H. PEDERSEN, *Primary Examiner.*

O. B. CHEW, *Assistant Examiner.*